(12) United States Patent
Yaghoubi et al.

(10) Patent No.: US 11,783,563 B2
(45) Date of Patent: Oct. 10, 2023

(54) SOFTWARE AND ALGORITHMS FOR USE IN REMOTE ASSESSMENT OF DISEASE DIAGNOSTICS

(71) Applicant: Quidel Corporation, San Diego, CA (US)

(72) Inventors: Houman Yaghoubi, San Diego, CA (US); Curtis Marsh, San Diego, CA (US); Scott Rongey, San Diego, CA (US); Ziad Salem, San Diego, CA (US); Adonis Stassinopoulos, Dublin, CA (US)

(73) Assignee: Quidel Corporation, San Diego, CA (US)

( * ) Notice: Subject to any disclaimer, the term of this patent is extended or adjusted under 35 U.S.C. 154(b) by 230 days.

(21) Appl. No.: 17/333,978

(22) Filed: May 28, 2021

(65) Prior Publication Data

US 2021/0374959 A1    Dec. 2, 2021

Related U.S. Application Data

(60) Provisional application No. 63/032,012, filed on May 29, 2020.

(51) Int. Cl.
*G06T 7/00* (2017.01)
*G06T 7/12* (2017.01)
(Continued)

(52) U.S. Cl.
CPC ............ *G06V 10/17* (2022.01); *G06T 7/0014* (2013.01); *G06T 7/12* (2017.01); *G06T 7/168* (2017.01);
(Continued)

(58) Field of Classification Search
None
See application file for complete search history.

(56) References Cited

U.S. PATENT DOCUMENTS

| 3,092,465 A | * | 6/1963 | Adams, Jr. ............... C12Q 1/54 |
| | | | 435/14 |
| 6,052,692 A | | 4/2000 | Anderson et al. |
| | | | (Continued) |

FOREIGN PATENT DOCUMENTS

| WO | WO 2010/081219 A1 | 7/2010 |
| WO | WO 2021/243179 A1 | 12/2021 |
| WO | WO 2021/243254 A2 | 12/2021 |

OTHER PUBLICATIONS

Carrio et al., "Automated Low-Cost Smartphone-Based Lateral Flow Saliva Test Reader for Drugs-of-Abuse Detection," Sensors 2015, 15, 29569-29593; doi:10.3390/s151129569 (Year: 2015).*

(Continued)

*Primary Examiner* — Soo Shin
(74) *Attorney, Agent, or Firm* — McDermott Will & Emery LLP; Judy M. Mohr; Brennen P. Baylor

(57) ABSTRACT

A method to assess a subject diagnosis is provided. The method includes receiving an image from an image-capturing device, the image comprising an area of interest in a test cartridge, and finding a border of the area of interest of the test cartridge and applying a geometrical transformation on an area delimited by the border of the test cartridge to bring the image of the area of interest in the test cartridge to a selected size and a selected shape. The method also includes identifying a target region within the area of interest of the test cartridge, evaluating a quality of the image based on a characteristic feature of the target region, and providing commands to adjust an optical coupling in the image-capturing device when the quality of the image is lower than a selected threshold.

28 Claims, 11 Drawing Sheets

(51) Int. Cl.
*G06T 7/168* (2017.01)
*G06T 7/80* (2017.01)
*G06V 10/10* (2022.01)
*G06V 10/24* (2022.01)
*G06V 10/25* (2022.01)

(52) U.S. Cl.
CPC ............... *G06T 7/80* (2017.01); *G06V 10/25* (2022.01); *G06T 2207/20081* (2013.01); *G06T 2207/20084* (2013.01); *G06T 2207/30168* (2013.01); *G06V 10/247* (2022.01)

(56) References Cited

U.S. PATENT DOCUMENTS

| | | | |
|---|---|---|---|
| 6,833,863 | B1 | 12/2004 | Clemens |
| D606,664 | S | 12/2009 | Jacono et al. |
| 9,207,181 | B2* | 12/2015 | Egan .................. G01N 21/6486 |
| 9,989,466 | B2 | 6/2018 | Booker et al. |
| 10,168,329 | B2 | 1/2019 | Ren et al. |
| 10,820,847 | B1 | 11/2020 | Andeshmand et al. |
| 2007/0031283 | A1 | 2/2007 | Davis et al. |
| 2009/0263854 | A1 | 10/2009 | Jocano et al. |
| 2010/0028870 | A1* | 2/2010 | Welch ...................... C12Q 1/68 707/E17.003 |
| 2012/0224053 | A1 | 9/2012 | Vykoukai et al. |
| 2015/0346097 | A1 | 12/2015 | Battrell et al. |
| 2016/0349185 | A1 | 12/2016 | Park et al. |
| 2017/0059566 | A1 | 3/2017 | Reed et al. |
| 2017/0254804 | A1* | 9/2017 | Cheng ............. G01N 33/54306 |
| 2017/0337912 | A1 | 11/2017 | Caligor et al. |
| 2018/0229232 | A1 | 8/2018 | Chang et al. |
| 2018/0341818 | A1 | 11/2018 | Steffanson |
| 2018/0367469 | A1 | 12/2018 | Re et al. |
| 2019/0299209 | A1 | 10/2019 | Dugan et al. |
| 2020/0256856 | A1* | 8/2020 | Chou ...................... G01N 33/80 |
| 2021/0373008 | A1 | 12/2021 | Yaghoubi et al. |
| 2021/0374959 | A1* | 12/2021 | Yaghoubi .............. G06T 7/0014 |

OTHER PUBLICATIONS

Carrio et al., "Automated Low-Cost Smartphone-Based Lateral Flow Saliva Test Reader for Drugs-of-Abuse Detection", Sensors (Basel), vol. 15, No. 11, pp. 29569-29593 (2015).
Foysal et al., "Analyte Quantity Detection from Lateral Flow Assay Using a Smartphone", Sensors, vol. 19, No. 21, Art. 4812, 19 pages (2019).
International Search Report from International Application No. PCT/US2021/034801, 4 pages, dated Sep. 13, 2021, application now published as International Publication No. WO2021/243179 on Dec. 2, 2021.
International Search Report from International Application No. PCT/US2021/034928, 5 pages, dated Dec. 3, 2021, application now published as International Publication No. WO2021/243254 on Dec. 2, 2021.
Liu et al., "Point-of-care testing based on smartphone: The current state-of-the-art (2017-2018)", Biosens. Bioelectron., vol. 132, pp. 17-37 (2019).
Saisin et al., "Significant Sensitivity Improvement for Camera-Based Lateral Flow Immunoassay Readers", Sensors (Basel), vol. 18, No. 11, Art. 4026, 8 pages (2018).

* cited by examiner

SOFTWARE AND ALGORITHMS FOR USE IN REMOTE ASSESSMENT OF DISEASE DIAGNOSTICS

CROSS REFERENCE TO RELATED APPLICATIONS

This application claims priority to, and benefit of, U.S. Provisional Application No. 63/032,012, filed May 29, 2020, the entire content of which is hereby incorporated by reference.

TECHNICAL FIELD

The present disclosure generally relates to devices and methods for home testing, telemedicine applications and other in-situ immunoassay measurements. More specifically, the present disclosure relates to methods for processing data collected by client devices in conjunction with consumables available to users in a simple and accurate procedure to assess a disease diagnostic, locally and/or remotely.

BACKGROUND

Currently, disease diagnostics using test assays involve users sending test samples to a laboratory for accurate analysis. This step is time-consuming, as it involves the physical displacement of a test cartridge (with the test sample, also referred to as "sample cartridge") back and forth (before use of the test sample) between the medical provider (e.g., clinic, physician, pharmacy), the laboratory and the user. Furthermore, these test samples tend to cause delays in clinical laboratories, many times unnecessarily (as many samples may be negative). Further, the time lag between test and result may be a potential hazard, e.g., for epidemic or pandemic emergencies, or when the outcome of treatment of a serious condition is dramatically impacted by the time of start of a therapy, or an infected user leave the office without an immediate result, neglecting follow up and proceeding to infect others.

BRIEF DESCRIPTION OF THE FIGURES

In the figures, elements with the same or similar reference number correspond to the same or similar elements, unless explicitly stated otherwise.

DETAILED DESCRIPTION

Figure 1:
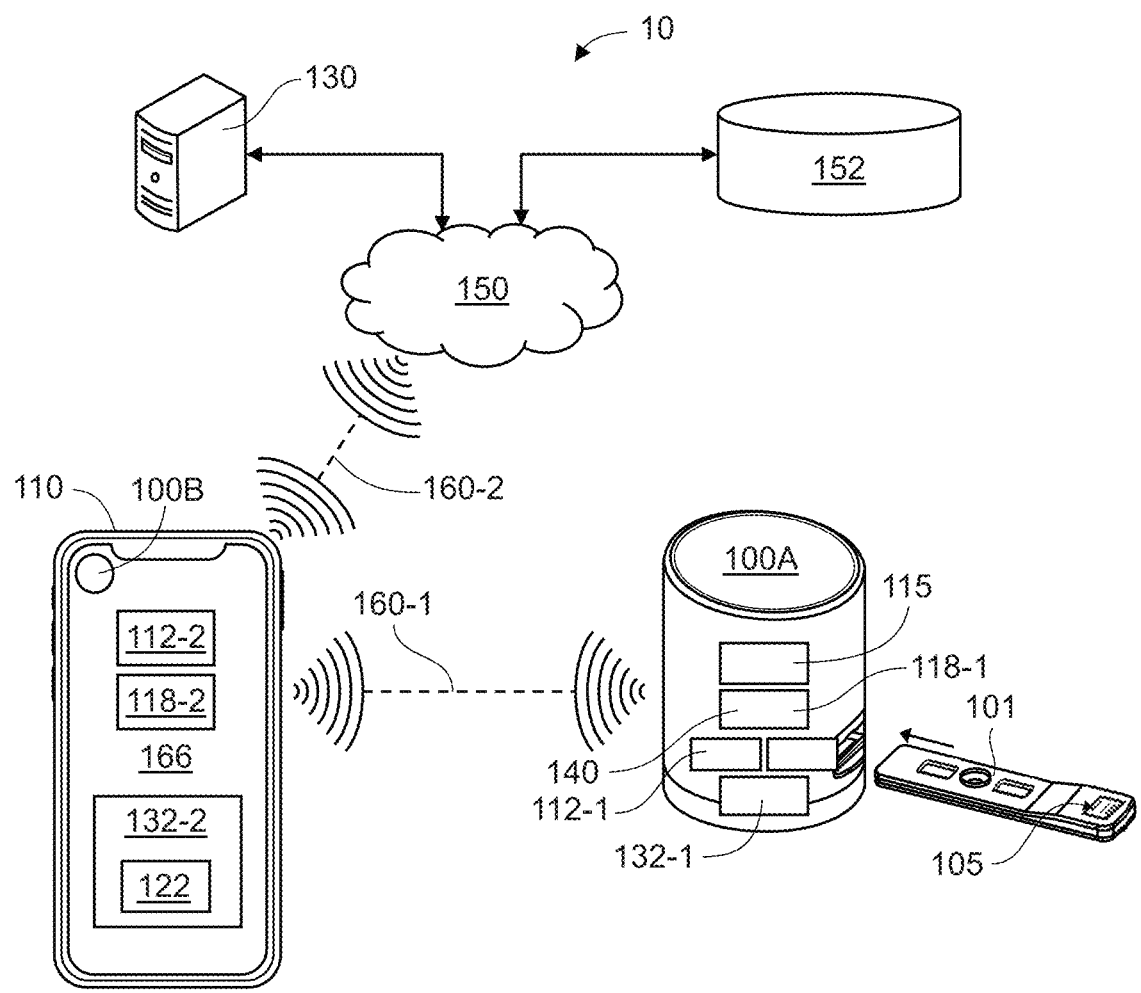
FIG. 1 illustrates an architecture including a remote server, a database, and an image-capturing device to collect an image from a test cartridge in an enclosure, according to some embodiments.

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

In the burgeoning area of telemedicine, it has become increasingly desirable to take advantage of the almost universal availability of electronic appliances that may have wireless network access and sensors, and that may also include increasingly higher computational capabilities. Moreover, some applications of remote measurement of immunoassays designed for the detection of chemical and biological agents or pathogens may include security tests and screening (e.g., at airports, police and military checkpoints), or environmental analysis and monitoring (e.g., air pollution, contamination of water ways and reservoirs—for disease control or agricultural production-, and the like).

Embodiments consistent with the present disclosure take advantage of the high image-capturing and processing capabilities of current consumer appliances to provide simple yet accurate diagnostic procedures for selected diseases or infections (e.g., legionella, influenza, Ebola, Lyme disease, myocardial infarction, Strep A, respiratory syncytial virus, human metapneumovirus, SARS-CoV2, and the like). The types of tests consistent with embodiments in the present disclosure may include any type of spectroscopic analysis of test assays using electromagnetic radiation, such as, without limitation, absorption spectroscopy (ultra-violet, visible, or infrared) including reflectance or transmittance spectroscopy, or emission spectroscopy, including fluorescence and luminescence spectroscopy, Raman spectroscopy, and any type of radiation scattering. Moreover, embodiments as disclosed herein may further exploit the networking capabilities of such appliances to enhance the processing capabilities of each test by using cloud-computing solutions. Accordingly, in some embodiments, a high quality (e.g., high spatial and spectral resolution) image, sequence of images, or video is uploaded to a remote server that can perform massively parallel computations to provide, in a reduced time, a diagnostic result. Such analyzed material may be processed immediately, at a later date/time, and/or may be compared to previously collected materials to determine differences over time, e.g., a time evolution of the analyte across a test strip. In other cases, the ability to collect and compile data libraries may enable the generation of self-teaching algorithms (Artificial Intelligence or Machine Learning algorithms) from the analysis of such image libraries to generate initial versions and improved versions as the size and diversity of such libraries increases.

The subject system provides several advantages, including the ability for a user to quickly learn whether a disease is present or latent, without the need to access specialized personnel, or a complex machine or instrument.

Some embodiments provide the advantage of widely broadening the market for medical test kits, as consumers who have wide access to image-capturing devices in the form of mobile computing devices and other appliances, may desire to perform tests even before perceiving any symptoms or going to a doctor or clinic. This also may provide the advantage of a screening step before people attend clinics or saturate the resources of a given medical facility. Further, the cost of a test for a remote user of methods as disclosed herein may be substantially lower than the cost associated with a visit to a clinic or laboratory, including waiting times, scheduling, taking an appointment away from a truly infected patient, or exposing a healthy patient to a waiting room full of sick people.

The proposed solution further provides improvements to the functioning of computers (e.g., the server or a user mobile device) because it saves data storage space and interaction time by enabling a remote transmission of image analysis data and results (e.g., pictures, sequences of pictures, and/or videos).

Although many examples provided herein describe a user's personal information and data as being identifiable, or a download and storage of a user interaction history with one or more remote clinics, each user may grant explicit permission for such user information to be shared or stored. The explicit permission may be granted using privacy controls integrated into the disclosed system. Each user may be provided notice that such user information will be shared with explicit consent, and each user may at any time end the information sharing, and may delete any stored user information. Further, in some embodiments, the stored user information may be encrypted to protect user security and identity.

FIG. 1 illustrates an architecture 10 including a remote server 130, a database 152, a client device 110 and an image-capturing device 100A to collect an image or video from a test cartridge 101, according to some embodiments. Client device 110 may include a smartphone or other mobile computing device (e.g., tablet, pad, or even laptop). In some embodiments, more than one image-capturing device can be controlled using one mobile computing device. Architecture 10 provides, in real-time, an accurate assessment as to the presence or not of one or more target analytes in a test sample from an assay result. The assay may be run in test cartridge 101, and may include an immunoassay for detecting the one or more analytes of interest in a biological sample. Test cartridge 101 may provide a substrate for flowing the biological sample on multiple test channels for detection of 1-20 analytes of interest (or more). Images of the assay as it progresses may be provided by image-capturing device 100A communicatively coupled with client device 110.

Test cartridge 101, in one embodiment, is an immunoassay test strip enclosed in a housing or cartridge to ease its handling. In other embodiments, test cartridge 101 is simply an immunoassay test strip, such as a dip stick. That is, an external housing is optional, and if present, need not be a cartridge or cassette housing but can be a flexible laminate, such as that disclosed in U.S. Patent Application Publication No. 2009/02263854 and shown in Design Pat. No. D606664. An immunoassay test strip, in one embodiment, comprises in sequence, a sample pad, a label pad, one or more lines or bands selected from a test line, a control line and a reference line, and an absorbent pad. In some embodiments, a support member is present, and each or some of the sample pad, label pad, lines, and absorbent pad are disposed on the support member. Exemplary immunoassay test strips are described, for example, in U.S. Pat. Nos. 9,207,181; 9,989,466; and 10,168,329 and in U.S. Publication Nos. 2017/0059566 and 2018/0229232, each of which is incorporated by reference herein. Additional details on immunoassay test strips are provided infra.

In some embodiments, the assay is an immunoassay including reagents for detection of an infectious agent (e.g., a virus or a bacterium) in the biological sample. In some embodiments, the immunoassay may include reagents for detection of protein, including Antibodies against specific analytes, or small molecule biomarker or an autoantibody. In some embodiments, the analytes of interest are detectable by emission of a unique signal associated with each analyte selected from the analytes of interest. In some embodiments, the biological sample includes a body fluid (e.g., blood, serum, plasma, sputum, mucus, saliva, tear, feces, or urine). In some embodiments, the biological sample is human and the presence of one or more target analytes may indicate a medical diagnostic for an individual providing the sample. Accordingly, in some embodiments, architecture 10 includes a user of client device 110 who has ordered a kit including test cartridge 101 and image-capturing device 100A and is ready to perform a personal test for a disease or condition remotely from a hospital or clinic or any other location (e.g., at home, in a pharmacy, retail store, doctor's office, and the like).

In architecture 10, image-capturing device 100A includes an enclosure 120 to prevent ambient light from perturbing or interfering with the measurement. In some embodiments, image-capturing device 100A wirelessly transmits an image of test cartridge 101 to client device 110. Client device 110 then may transmit the image or video to a remote server 130, to database 152, or both, via network 150, for processing. In some embodiments, image-capturing device 100A and/or client device 110 may perform at least one or more operations to the image or one or more image frames from a video using processors 112-1 and/or 112-2, respectively (hereinafter, collectively referred to as "processors 112"), before transmitting the image to server 130 or to database 152. For example, in some embodiments, client device 110 may perform at least one or more quality control steps over the one or more images provided by image-capturing device 100A before transmitting to server 130. In some embodiments, client device 110 may obtain a preliminary or a definitive diagnostic based on the analysis of the image of test cartridge 101. Accordingly, in some embodiments, client device 110 may transmit the preliminary or definitive diagnostic to server 130 with or without an image of test cartridge 101. To perform their operations, processors 112 may execute instructions and collect or save data, the instructions and data stored in a memory 132-1 (in image-capturing device 100A) or in a memory 132-2 (in client device 110).

Client device 110 communicates with image-capturing device 100A via a signal 160-1 and/or with server 130 via a signal 160-2, using a communication module 118-2. For example, in some embodiments, signal 160-1 includes a transmittable file generated by processor 112-1, including data from an array sensor collecting an image from test cartridge 101. And signal 160-2 may include a diagnostic of the assay based on image analysis of the transmittable file. Image-capturing device 100A may communicate with client device 110 through a communication module 118-1. Signals 160-1 and 160-2 (hereinafter, collectively referred to as "signals 160"), may be digital or analog signals, wireless signals, radio-frequency (RF) signals, electrical signals, Ethernet signals, and the like. Communication modules 118-1 and 118-2 will be collectively referred to, hereinafter, as "communication modules 118." Communication modules 118 may include hardware and software associated with RF antennas for communication via WiFi, Bluetooth (e.g., low energy Bluetooth, BLE), or nearfield contact (NFC) protocols. For example, when image-capturing device 100A and client device 110 are relatively close to each other, communication module 118 may include a BLE or NFC protocol. In addition, any one of signals 160 may be encrypted and/or encoded for security purposes.

In some embodiments, image-capturing device 100A may include a sensor array 140 and an optics coupling mechanism 115 (e.g., a lens system with autofocus capabilities). Sensor array 140 may collect one or more images of test cartridge 101 at a desired frame rate, to form a video. In some embodiments, sensor array 140 may collect a single image of test cartridge 101 (e.g., after an assay has run its course), or more than one image (e.g., before and after an assay runs its course). In yet some embodiments, sensor array 140 may collect multiple images of test cartridge 101 at a pre-selected frequency rate (e.g., as the test cassette is running). The frequency rate may be adjusted, modified, accelerated, or slowed, based on preliminary or quality control tests performed by client device 110.

Remote server 130 may provide support for an image-capturing application 122 installed in memory 132-2 of client device 110. The support may include update installation, retrieval of raw data (e.g., pictures, sequences of pictures and videos) for storage in database 152, image processing, and the like. Image-capturing application 122 may include commands and instructions to control image-capturing device 100A. Image-capturing application 122 may also include commands and instructions to perform at least a partial analysis of the one or more images provided by image-capturing device 100A. For example, in some embodiments, the instructions in image-capturing application 122 may include a neural network (NN), artificial intelligence (AI), or a machine learning (ML) algorithm to assess a diagnostic based on the one or more images of test cartridge 101. Additionally, in some embodiments, image-capturing application 122 may include instructions to assess a quality control of the one or more images provided by image-capturing device 100A, based on sensor data indicative of the positioning of test cartridge 101 within enclosure 120. The sensor data may be provided by sensors disposed within enclosure 120.

In some embodiments, client device 110 may further include an image-capturing device 100B to collect an image of a fiduciary label 105 on test cartridge 101. Accordingly, image-capturing application 122 may incorporate the image of a label 105 on test cartridge 101 into a measurement protocol. The measurement protocol may be transmitted by client device 110 to server 130 and/or to database 152, where metadata associated with sampling cartridge 101 may be correlated with information stored therein. For example, in some embodiments, the metadata in fiduciary label 105 may be correlated with a user ID and with an assay identification code (e.g., flu test, Lyme disease test, pregnancy test, hepatitis, or any other disease or assay). Hereinafter, image-capturing devices 100A and 100B will be collectively referred to as "image-capturing devices 100."

In some embodiments, image-capturing application 122 may also include instructions for the user as to the mode of use and a measurement protocol for test cartridge 101. For example, the instructions may illustrate to the user, step by step, how to collect a sample (e.g., using a swab or other extraction mechanism), mix the sample with appropriate reagents, and provide at least a portion of the sample into test cartridge 101. Accordingly, image-capturing application 122 may display the instructions and other illustrative icons to the user on a display 116 of client device 110.

Figure 2:
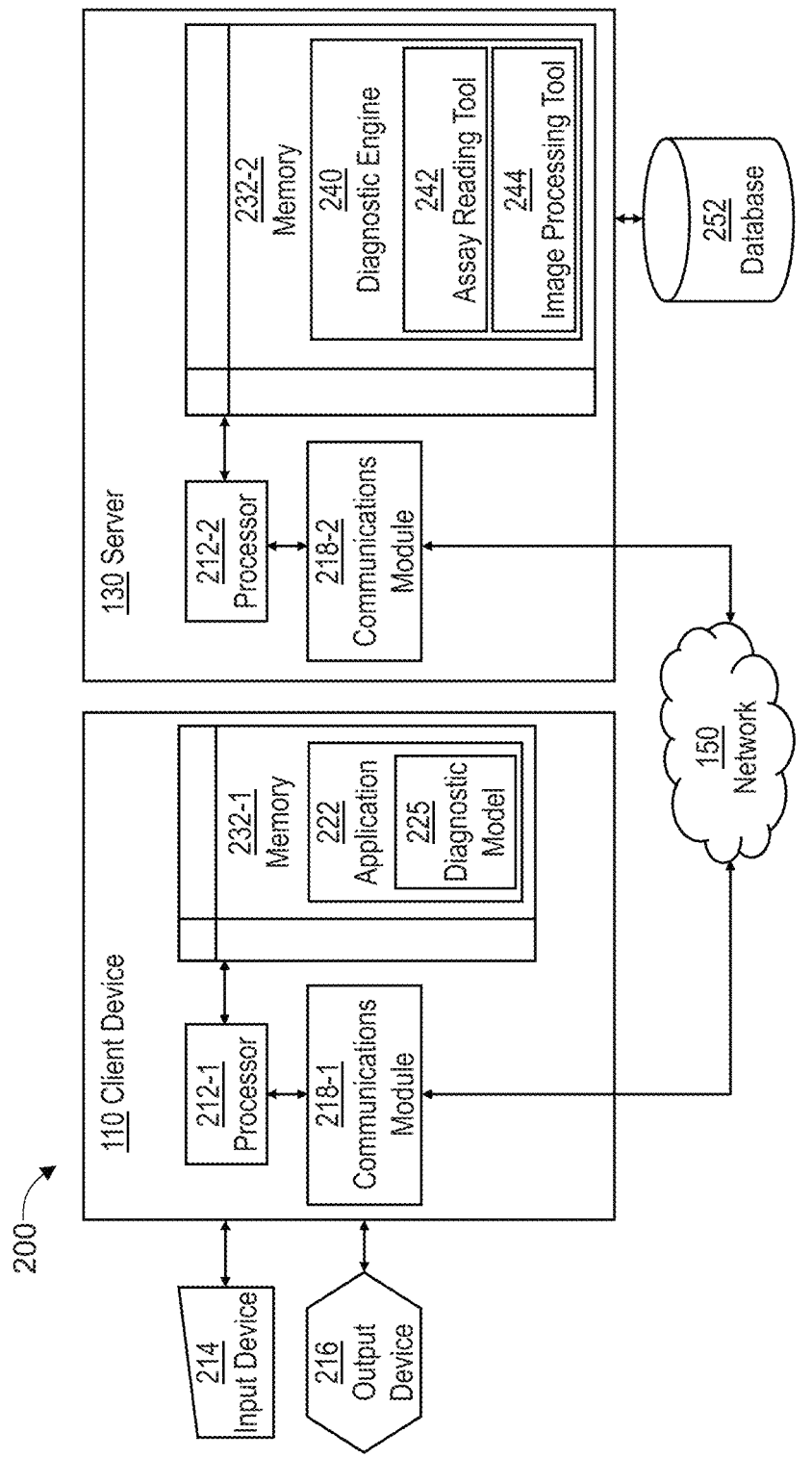
FIG. 2 illustrates details in devices used in the architecture of FIG. 1.

FIG. 2 illustrates an example server 130 and client device 110 in architecture 10 (cf. FIG. 1), according to certain aspects of the disclosure. Client device 110 and server 130 are communicatively coupled over network 150 via respective communications modules 218-1 and 218-2 (hereinafter, collectively referred to as "communications modules 218"). Communications modules 218 interface with network 150 to send and receive information, such as data, requests, responses, and commands to other devices on the network. Communications modules 218 can be, for example, modems or Ethernet cards and other RF hardware and software (e.g., antennas, modulators, demodulators, phase-locked loops, digital-to-analog converters, digital signal processors, and the like). A user may interact with client device 110 via an input device 214 and an output device 216. Input device 214 may include a mouse, a keyboard, a pointer, a touchscreen, a microphone, and the like. Output device 216 may be a screen display, a touchscreen, a speaker, and the like. Client device 110 may include a memory 232-1 and a processor 212-1. Memory 232-1 may include an application 222, configured to run in client device 110. Application 222 may be downloaded by the user from server 130, and may be hosted by server 130.

Server 130 includes a memory 232-2, a processor 212-2, and communications module 218-2. Hereinafter, processors 212-1 and 212-2, and memories 232-1 and 232-2 will be collectively referred to, respectively, as "processors 212" and "memories 232." Processors 212 are configured to execute instructions stored in memories 232. In some embodiments, memory 232-2 includes a diagnostic engine 240. Diagnostic engine 240 may share or provide features and resources to application 222, including tools associated with image-processing and predictive analysis. The user may access diagnostic engine 240 through application 222 or a web browser installed in a memory 232-1 of client device 110. Accordingly, application 222 may be installed by server 130 and perform scripts and other routines provided by server 130 through any one of multiple tools. Execution of application 222 may be controlled by processor 212-1.

In that regard, diagnostic engine 240 may include an assay reading tool 242 and an image processing tool 244. Diagnostic engine 240 may have access to a history of assay images and/or videos collected from other users, including diagnostic results, stored in a database 252 (e.g., through network 150). In some embodiments, diagnostic engine 240, the tools contained therein, and at least part of database 252 may be hosted in a different server communicatively coupled with server 130.

In some embodiments, application 222 may include a diagnostic model 225, which may be a portion or a simplified version of diagnostic engine 240, stored in memory 232-1 and executed by processor 212-1. Diagnostic model 225 may provide a classification of the input image of the assay as "Positive," (target analyte detected above a sensitivity value) "Negative," (target analyte not detected above a sensitivity value) or "Invalid" (measurement error, low SNR, un-calibrated measurement, and the like). Accordingly, in some embodiments, diagnostic model 225 may be a faster and simplified version of diagnostic engine 240 that enables the user of client device 110 to more quickly reach a decision regarding the progress of an assay in the test cartridge and/or monitor general function of the device including, but not limited to, temperature range, light leakage, and the like. This may be helpful in remote locations where network 150 may be unreliable or the connectivity be slow, noisy, sporadic, or lost.

In some embodiments, more than one diagnostic model may be used to provide a "Positive," "Negative," or "Invalid" classification. When more than one model is used, concurrence and/or agreement of the models is ascertained for determination of a result classification. In some embodiments, the models may be developed based on the same images. In some embodiments, each of the multiple models possess unique characteristics for classification determination. In such embodiments, a "Positive," "Negative," or "Invalid" classification may be more robust and less prone to false positive or false negative results due to the classification being based on multiple models.

Figure 3:
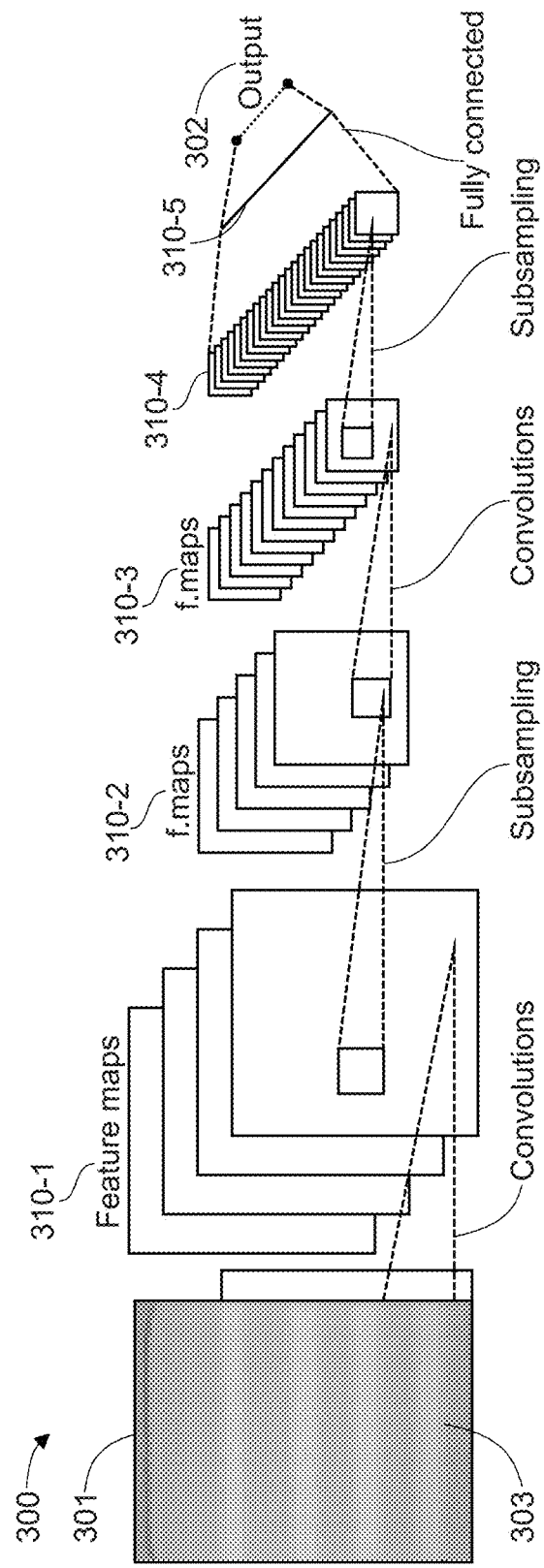
FIG. 3 illustrates an architecture of a convolutional neural network to provide a disease diagnostic from one or more images from a sample assay, according to some embodiments.

FIG. 3 illustrates an architecture of a convolutional neural network (CNN) 300 to provide a disease diagnostic from one or more images from a sample assay, according to some embodiments. CNN 300 may include a deep neural network (DNN) applied to analyzing visual imagery. In some embodiments, CNN 300 includes a regularized version of a fully connected network in which each neuron in one layer is connected to all neurons in the next layer.

CNN 300 may include an input layer 301 and an output layer 302. Input layer 301 may include a pixelated image 303 or even a collection of pixelated images forming a volume (e.g., an image of a test assay or multiple images of an evolving test assay, or a video). For example, in the case of a volume formed by multiple two-dimensional images in a video sequence, image 303 may include three-dimensional pixels, or 'voxels.' CNN 300 also includes multiple hidden layers 310-1, 310-2, 310-3, 310-4, and 310-5 (hereinafter, collectively referred to as "hidden layers 310") linking input layer 301 with output layer 302. Output layer 302 may be a binary answer to the question of whether one or more of the target analytes are present in the sample, according to the assay in image 303. Accordingly, in some embodiments, output layer 302 includes a vector having a number of components equal to the number of target analytes in the assay. Each of the components in the vector in output layer 302 may include a binary value, e.g., '0' for absent and '1' for present. In some embodiments, each of the components in output layer 302 may include a real number between '0' and '1,' indicative of a probability that a given target analyte is present in the sample, or even its concentration in the sample (e.g., by normalized weight or volume, or any other normalization measure).

Hidden layers 310 may include convolutional layers that convolve one or more pixels or voxels from input layer 301 with a suitably chosen multiplication factor or dot product. Coupling each of hidden layers 310 with one another, an activation function may include a rectifier function (e.g., a rectified linear unit, or RELU) subsequently followed by additional convolutions such as pooling layers, fully connected layers, and normalization layers, referred to as hidden layers because their inputs and outputs are masked by the activation function and a final convolution.

The final convolution, in turn, may include a backpropagation to more accurately weight the end result in output layer 302. In a backpropagation step, a value from output layer 302 is entered at each of hidden layers 310 (from last to first, in reverse order). At each step, a pseudo-inverse transformation is applied and the most likely input is obtained for the given output. Repeating this process back to input layer 301, a most likely assay input is obtained after back propagating an output value. A measure of the difference between the most likely input and the real input in input layer 301 indicates whether or not some of the convolution parameters and sampling parameters (e.g., for the RELU transformation) are desirably changed.

Figure 4A:
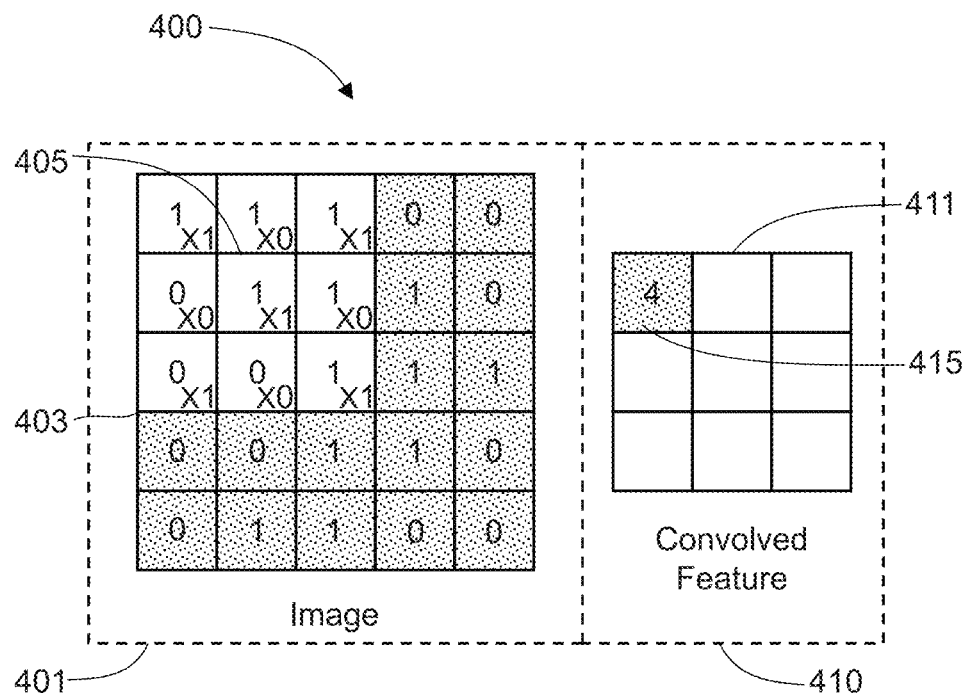
FIGS. 4A-B illustrate a convolution operation between two layers in a convolutional neural network, according to some embodiments.
Figure 4B:
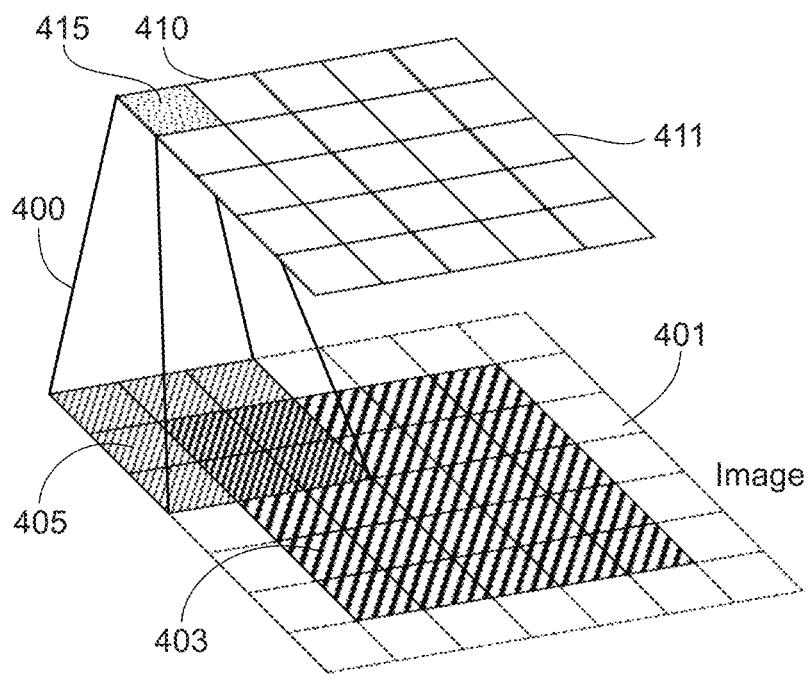

FIGS. 4A-B illustrate a convolution operation 400 between two layers in a convolutional neural network, according to some embodiments. The first layer may include a pixelated image 403 as part of input layer 401, and the convolved layer may include a feature map 411 in a hidden layer 410.

FIG. 4A shows convolution 400 in more detail. Convolution 400 adds each element along the diagonals of a selected portion 405 of image 403 (x1 factor), and neglects every other element of selected portion 405 (x0 factor). Thus, element 415 in hidden layer 410 has a value '4.' Selected portion 405 may include a digital portion of pixelated image 403. In some embodiments, the remaining elements in hidden layer 410 are determined in the same way as element 415, simply moving selected portion 405 in either direction across pixelated image 403.

Note that convolution 400 reduces the dimensionality of pixelated image 403 from a 5×5 matrix to a 3×3 matrix in hidden layer 410. The reduction in dimensionality is arbitrary and may be selected according to a better predictability at the output layer, or according to any other criterion such as computational cost, time to completion, and the like. In some embodiments, the size of selected portion 405 in convolution 400 may be selected according to multiple criteria, including a desire to reduce computational cost. For example, a ⅑ reduction in computational power may be obtained when selected portion 405 is reduced from a 3×3 portion to a 1×1 portion.

FIG. 4B illustrates the formation of feature map 411 in layer 410 as a result of applying convolution 400 to all pixels in image 403. Element 415, is obtained by applying convolution function 400 to selected portion 405. Note a reduction in the dimension (5×5) of feature map 411 is reduced relative to the dimension (7×7) of image 403 as a result of the 3×3 convolution 400. In transitioning from input layer 401 to layer 410, multiple convolution functions 400, each associated to a different filter, may result in multiple feature maps 411, each associated with a different feature from image 403.

Figure 5A:
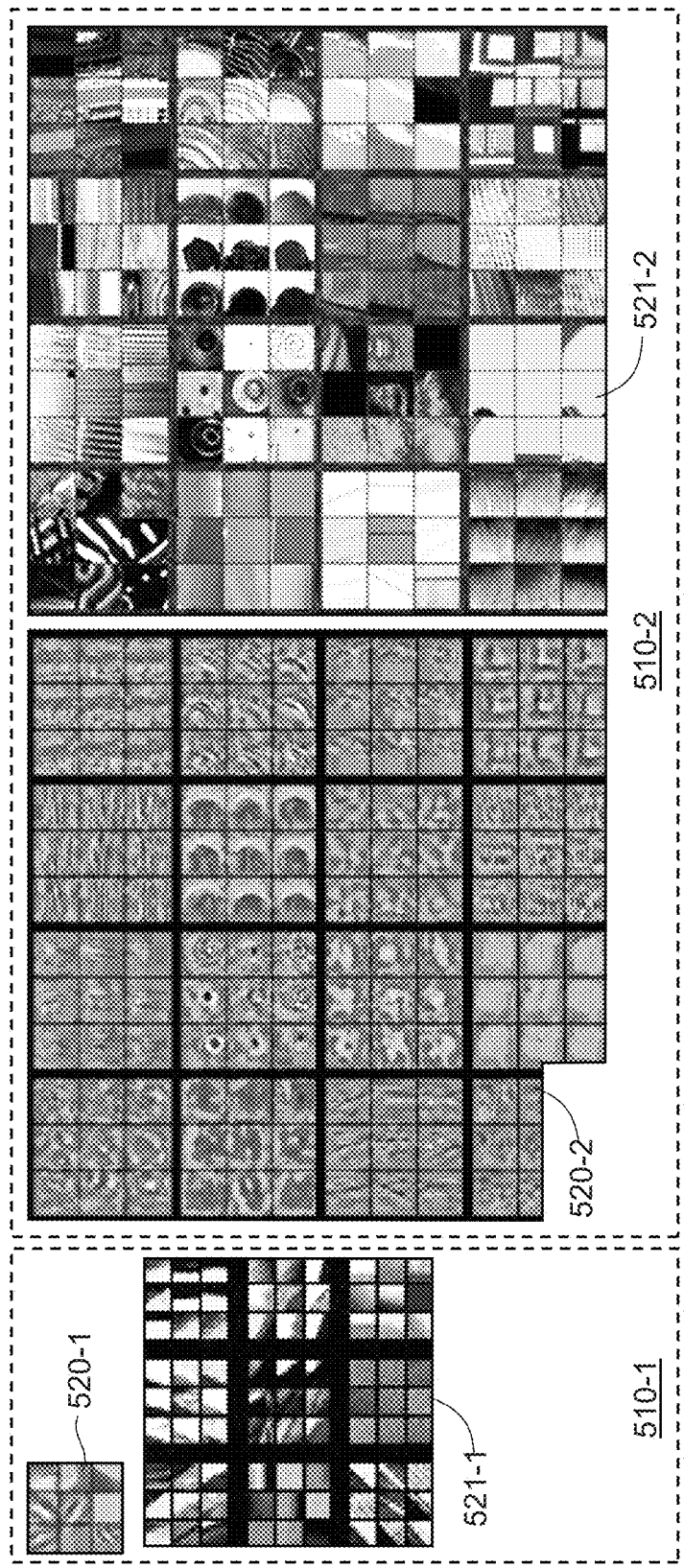
FIGS. 5A-B illustrate the content of multiple nodes in multiple layers in a convolutional neural network, according to some embodiments.
Figure 5B:
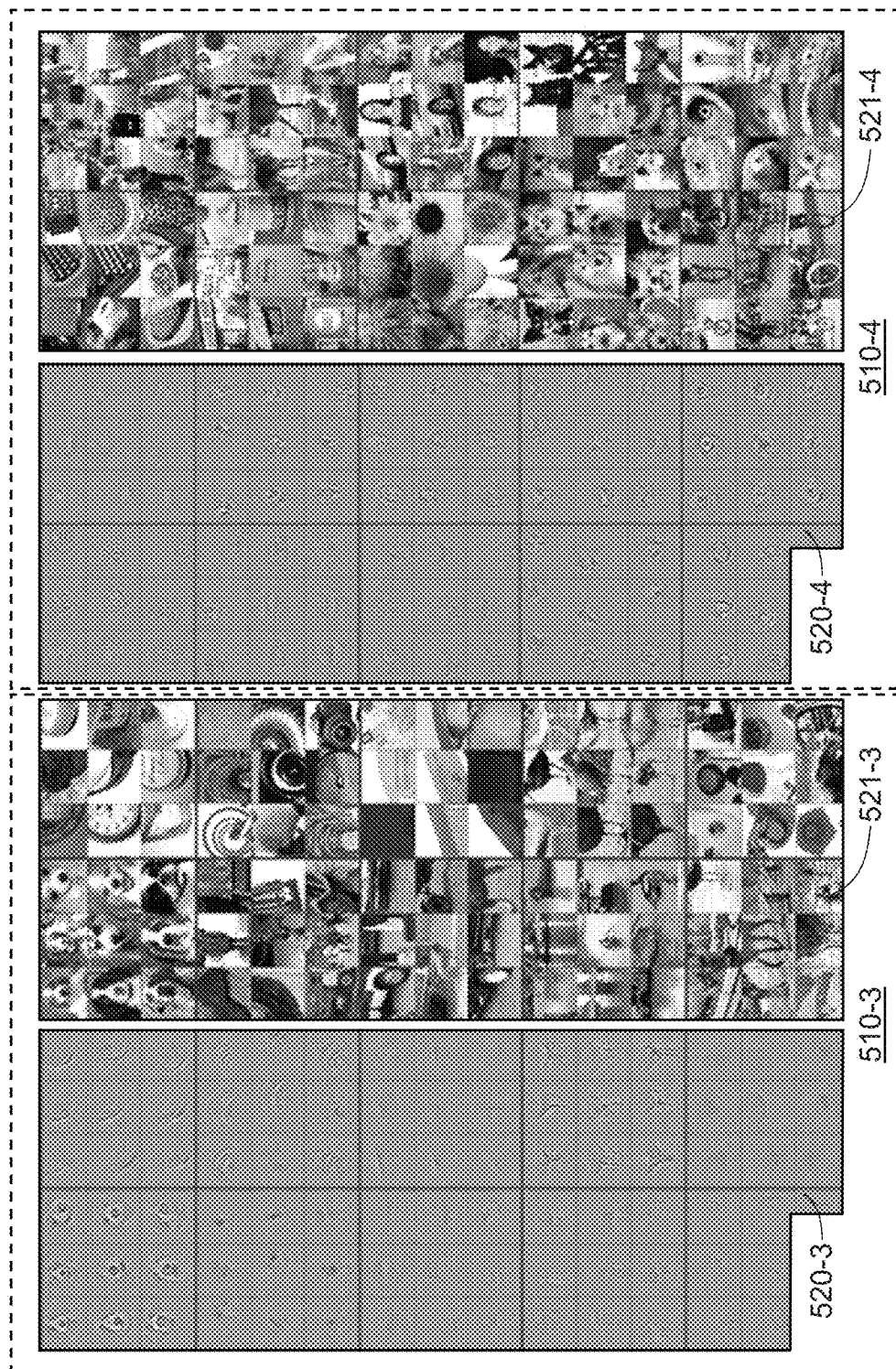

FIGS. 5A-B illustrate the content of multiple nodes in multiple layers 510-1, 510-2, 510-3, and 510-4 (hereinafter, collectively referred to as "layers 510") in a convolutional neural network, according to some embodiments. Each of layers 510 includes a set of filters 520-1, 520-2, 520-3, and 520-4 (hereinafter, collectively referred to as "filters 520") and a corresponding set of feature maps 521-1, 521-2, 521-3, and 521-4 (hereinafter, collectively referred to as "feature maps 521").

Filters 520 include different convolutional functions (e.g., filters) applied to the same input, to obtain a specific feature map 521 for each filter 520. Accordingly, some embodiments include a squeezing convolutional step where the number of filter maps is reduced between a given layer 510 and the next. In a squeezing convolutional step, filters 520 may have a reduced dimension (e.g., 1×1 convolution rather than 3×3 convolution) to reduce the computational cost. In some embodiments, late down sampling enables the system to maintain multiple feature maps 521 throughout more hidden layers 510, thus providing a more detailed and accurate network that can target more refined features in an assay (e.g., multiple target analytes and potential interactions or correlations among them). In some embodiments, an expanding convolutional step increases the number of filters 520 and feature maps 521 and may include larger convolution sets (e.g., 1×1 and 3×3 convolutions).

Figures 6, 7A:
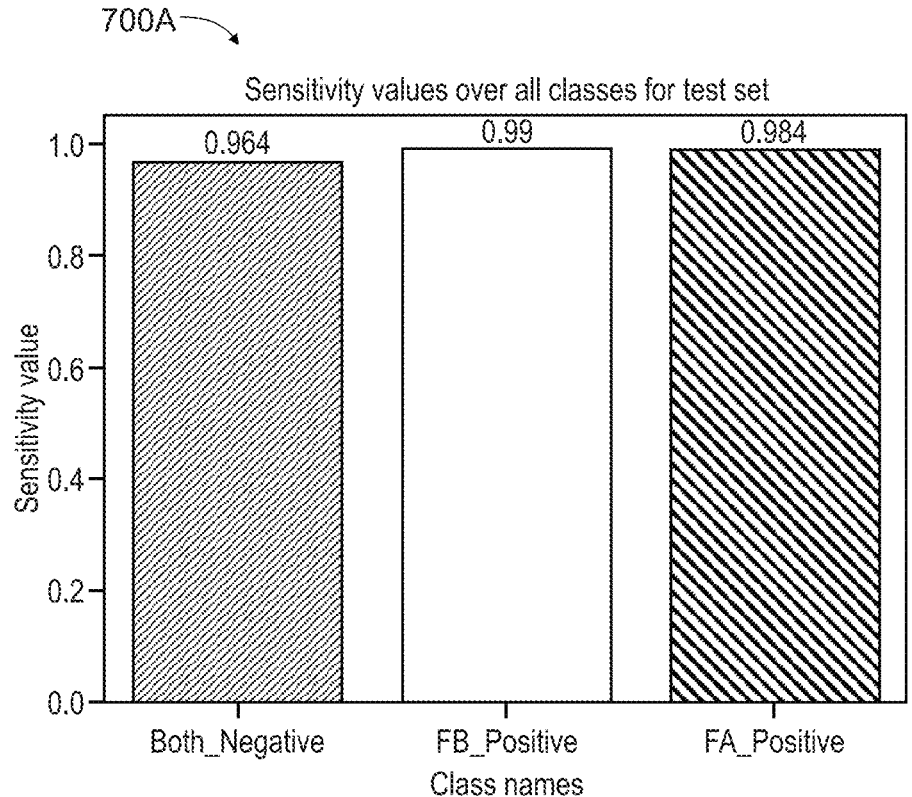
FIG. 6 illustrates a table of results for an assay diagnosis including two targets, according to some embodiments.
FIGS. 7A-B illustrate sensitivity and selectivity results for an assay diagnosis including two targets, according to some embodiments.

FIG. 6 illustrates a table of results 600 for an assay diagnosis including two targets, according to some embodiments. The assay used for table 600 is a binary assay for Flu A (FA) and Flu B (FB) detection. The analysis was performed by a diagnostics engine using assay reading tools and image processing tools as disclosed herein (e.g., diagnostic engine 240, assay reading tool 242 and image processing tool 244, application 222 and diagnostic model 225). For example, at least some of the results in table 600 were obtained using a CNN as disclosed herein (e.g., CNN 300). Table 600 represents a 3×3 matrix cross-correlating the different combinations of positive and negative FA/FB results.

Figure 7B:
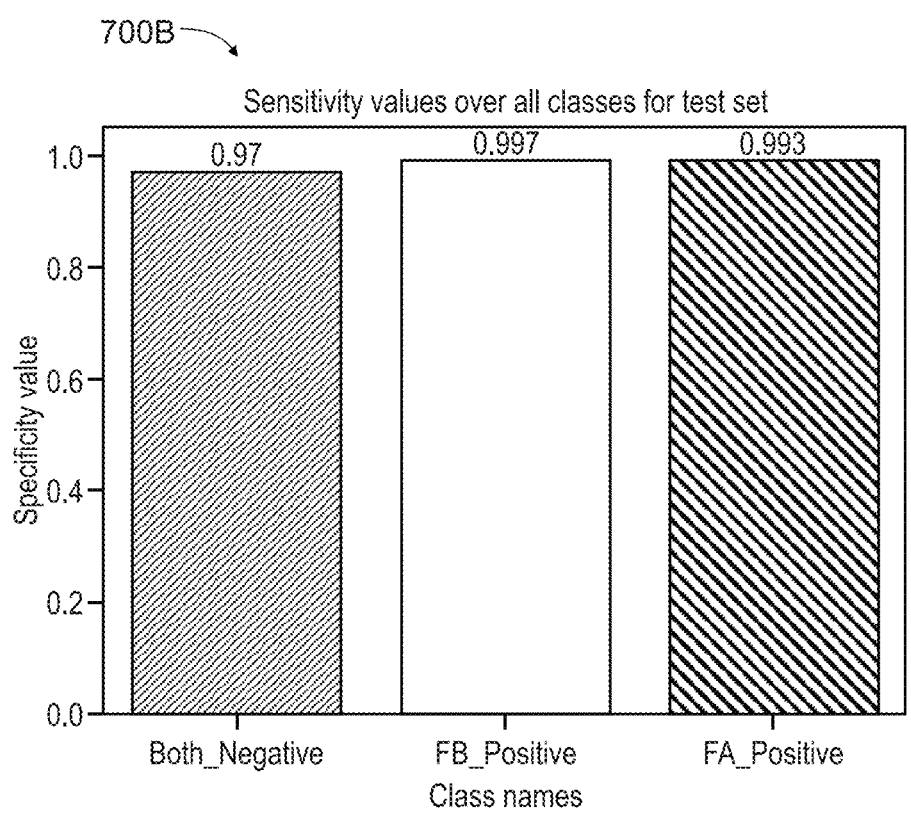

FIGS. 7A-B illustrate a sensitivity chart 700A and a specificity chart 700B resulting for an assay diagnosis including two targets, according to some embodiments (hereinafter, collectively referred to as "charts 700"). The assay used for charts 700 is the binary assay for FA and FB detection from table 600.

In some embodiments, a single assay may determine presence or absence of one or more analytes of interest. In an embodiment, and by way of example, a single assay may determine presence and/or absence of each of influenza A and influenza B, independently or simultaneously, or overlapping in time, and the system may report an aggregated result when desired (e.g. influenza A positive, influenza B positive, influenza A negative, influenza B negative, and combinations thereof). In an embodiment, and by way of example, a single assay may determine presence and/or absence of each of respiratory syncytial virus, influenza A, influenza B, and human metapneumovirus, independently or simultaneously, or overlapping in time, and the system may report an aggregated result when desired (e.g. influenza A positive, influenza B positive, respiratory syncytial virus, negative, human metapneumovirus negative, and combinations thereof). In an embodiment, and by way of example, a single assay may determine presence and/or absence of each of respiratory syncytial virus, influenza A, influenza B, and SARS CoV2, independently or simultaneously, or overlapping in time, and the system may report an aggregated result when desired (e.g. influenza A positive, influenza B positive, respiratory syncytial virus, negative, SARS CoV2 negative, and combinations thereof). Furthermore, in some embodiments the system may report the results for a given test differently to different parties (e.g. report Flu+/− to the patient/customer and the details such as Flu A+/− and Flu B+/− to the doctor or government agency).

FIG. 7A illustrates a sensitivity chart 700A. The values in chart 700A indicate a likelihood that a diagnostic engine as disclosed herein will detect either FA or FB when the sample comes from an individual that has the respective disease(s).

FIG. 7B illustrates a specificity chart 700B. The values in chart 700B indicate a likelihood that a diagnostic engine as disclosed herein will NOT detect either FA or FB when the sample comes from an individual that does NOT have the respective disease(s).

Figure 8:
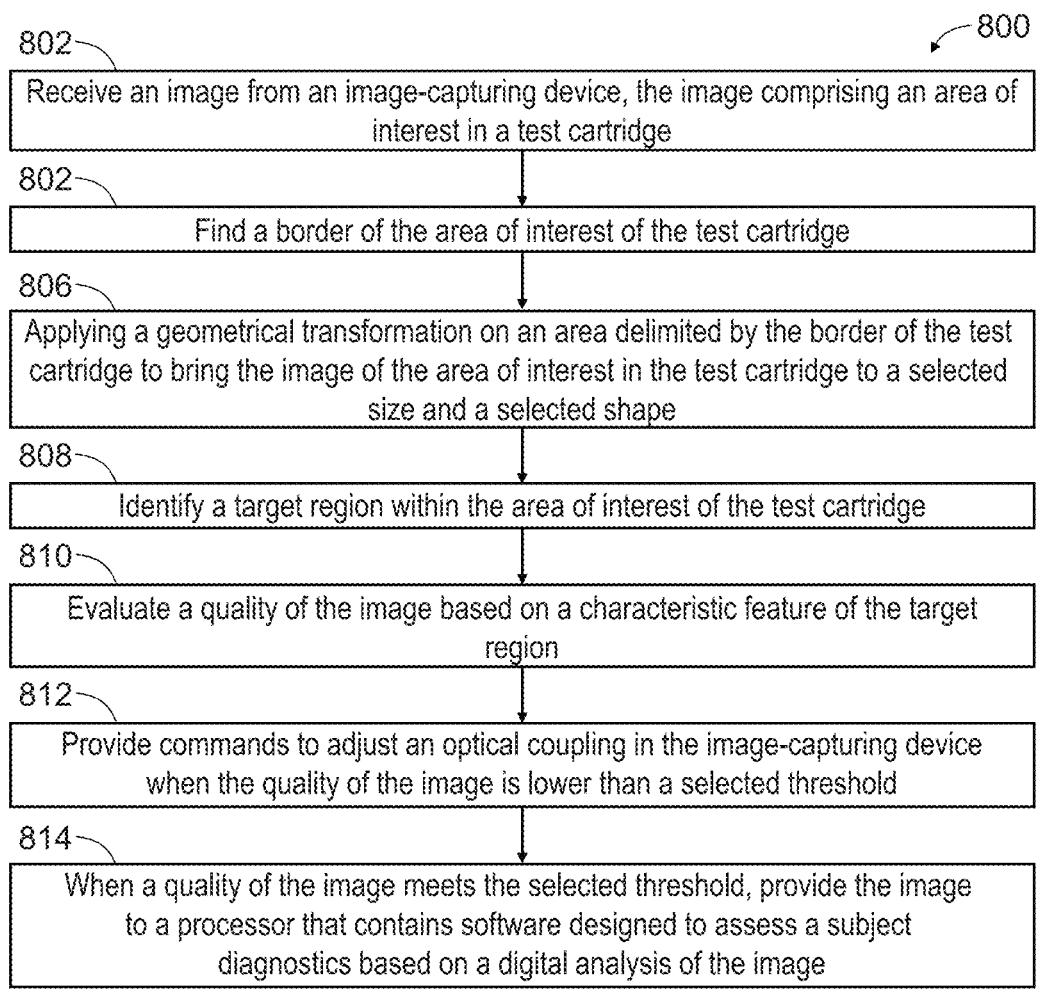
FIG. 8 is a flow chart illustrating steps in a method for determining the presence or absence of an analyte of interest, according to some embodiments.

FIG. 8 is a flow chart illustrating steps in a method 800 for determining the presence or absence of an analyte of interest, according to some embodiments. Methods consistent with the present disclosure may include at least one or more of the steps in method 800 performed at least partially by one or more devices in an architecture including a remote server, a database, a client device, and an image-capturing device as disclosed herein (e.g., architecture 10, remote server 130, database 152, client device 110, and image-capturing devices 100). Either one of the server, the database, the client device, and the image-capturing device may include a memory circuit storing instructions and a processor circuit configured to execute the instructions to perform, at least partially, one or more of the steps in method 800 (e.g., memory circuit 132, and processor circuit 112). In some embodiments, at least one or all of the server, the database, the client device, or the image-capturing device may include a communications module configured to transmit and receive data to one or more of the devices in the architecture, through a network or via a one-to-one (wired or wireless) communication channel (e.g., communications modules 118 and network 150). In some embodiments, at least one of the steps in method 800 may be partially performed by a diagnostic engine in a server, using an assay reading tool and an image processing tool as disclosed herein (e.g., diagnostic engine 240, assay reading tool 242, and image processing tool 244). In some embodiments, at least one of the steps in method 800 may be partially performed by an application installed in a client device, the application including a diagnostic model hosted by the server (e.g., application 222 and diagnostic model 225). The image-capturing device may include an enclosure enshrouding a coupling mechanism and a cartridge mount configured to receive a test cartridge (e.g., enclosure 120, coupling mechanism 115, and test cartridge 101). The image of the illuminated test cartridge may include at least a portion of a reading zone in the test cartridge, delimited by a border line. The reading portion may include an immunoassay (e.g., a lateral flow immunoassay). In some embodiments, the lateral flow immunoassay may include a series of images of a lateral flow immunoassay collected over time.

In some embodiments, methods consistent with the present disclosure may include at least one step from method 800, or more than one step from method 800 performed in a different order, or overlapping in time. For example, some embodiments consistent with the present disclosure may include one or more steps in method 800 performed simultaneously, or quasi-simultaneously.

Step 802 includes receiving an image from an image-capturing device, the image including an area of interest in a test cartridge.

Step 804 includes finding a border of the area of interest of the test cartridge and applying a geometrical transformation on an area delimited by the border of the test cartridge to bring the image of the area of interest in the test cartridge to a selected size and a selected shape.

Step 806 includes applying a geometrical transformation on an area delimited by the border of the test cartridge to bring the image of the area of interest in the test cartridge to a selected size and a selected shape.

Step 808 includes identifying a target region within the area of interest of the test cartridge. In some embodiments, the target region comprises a process control area including at least one of a positive control area or a negative control area, and step 808 includes evaluating a signal intensity in the process control area.

In some embodiments, step 808 includes identifying at least a test line and a control line in the area of interest of the test cartridge within a field of view of the image.

Step 810 includes evaluating a quality of the image based on a characteristic feature of the target region. In some embodiments, step 810 includes comparing a selected feature of the image with a value associated with selected features of multiple images having known quality values.

Step 812 includes providing commands to adjust an optical coupling in the image-capturing device when the quality of the image is lower than a selected threshold.

Step 814 includes providing the image to a processor that contains software designed to assess a subject diagnostics based on a digital analysis of the image when a quality of the image meets the selected threshold. In some embodiments, step 814 includes displaying the image in a computer display, and including a viewing guide in the computer display, the viewing guide overlapping at least a portion of the digital analysis of the image. In some embodiments, step 814 includes displaying a test result in a computer display, and not displaying the image.

Figure 9:
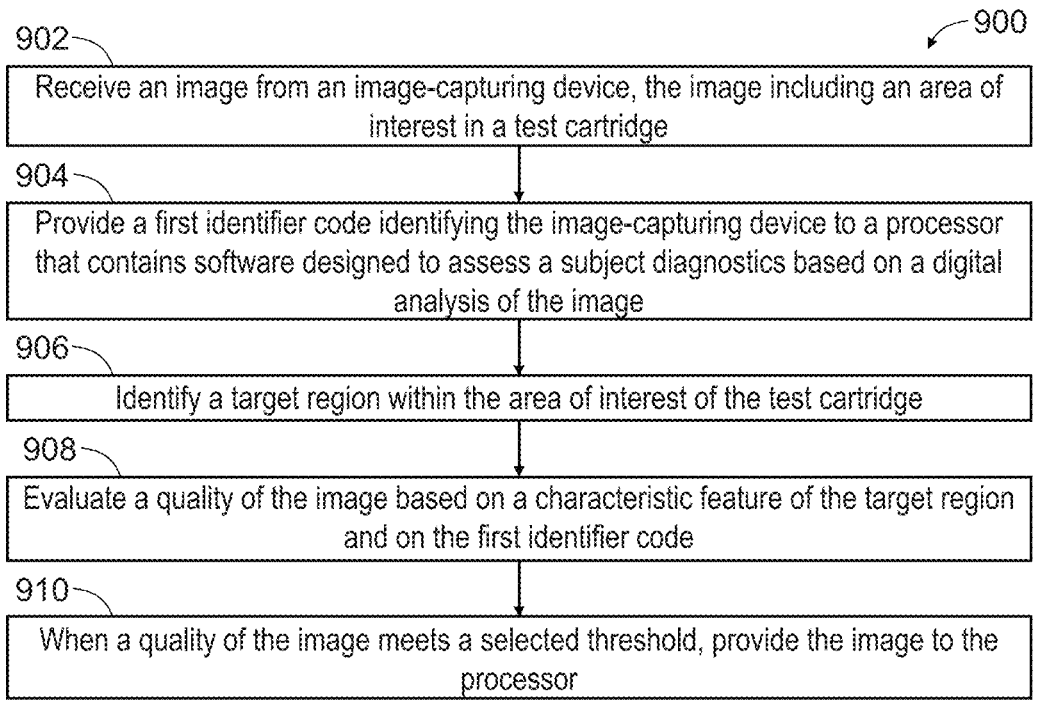
FIG. 9 is a flow chart illustrating steps in a method for determining the presence or absence of an analyte of interest, according to some embodiments.

FIG. 9 is a flow chart illustrating steps in a method 900 for determining the presence or absence of an analyte of interest, according to some embodiments. Methods consistent with the present disclosure may include at least one or more of the steps in method 900 performed at least partially by one or more devices in an architecture including a remote server, a database, a client device, and an image-capturing device as disclosed herein (e.g., architecture 10, remote server 130, database 152, client device 110, and image-capturing devices 100). Either one of the server, the database, the client device, and the image-capturing device may include a memory circuit storing instructions and a processor circuit configured to execute the instructions to perform, at least partially, one or more of the steps in method 900 (e.g., memory circuit 132, and processor circuit 112). In some embodiments, at least one or all of the server, the database, the client device, or the image-capturing device may include a communications module configured to transmit and receive data to one or more of the devices in the architecture, through a network or via a one-to-one (wired or wireless) communication channel (e.g., communications modules 118 and network 150). In some embodiments, at least one of the steps in method 900 may be partially performed by a diagnostic engine in a server, using an assay reading tool and an image processing tool as disclosed herein (e.g., diagnostic engine 240, assay reading tool 242, and image processing tool 244). In some embodiments, at least one of the steps in method 900 may be partially performed by an application installed in a client device, the application including a diagnostic model hosted by the server (e.g., application 222 and diagnostic model 225). The image-capturing device may include an enclosure enshrouding a coupling mechanism and a cartridge mount configured to receive a test cartridge (e.g., enclosure 120, coupling mechanism 115, and test cartridge 101). The image of the illuminated test cartridge may include at least a portion of a reading zone in the test cartridge, delimited by a border line. The reading portion may include an immunoassay (e.g., a lateral flow immunoassay). In some embodiments, the lateral flow immunoassay may include a series of images of a lateral flow immunoassay collected over time.

In some embodiments, methods consistent with the present disclosure may include at least one step from method 900, or more than one step from method 900 performed in a different order, or overlapping in time. For example, some embodiments consistent with the present disclosure may include one or more steps in method 900 performed simultaneously, or quasi-simultaneously.

Step 902 includes receiving an image from an image-capturing device, the image comprising an area of interest in a test cartridge.

Step 904 includes providing a first identifier code (e.g., a mobile device ID, and the like) identifying the image-capturing device to a processor that contains software designed to assess a subject diagnostics based on a digital analysis of the image.

Step 906 includes identifying a target region within the area of interest of the test cartridge.

Step 908 includes evaluating a quality of the image based on a characteristic feature of the target region and on the first identifier code. In some embodiments, step 908 includes selecting a threshold for a signal intensity in a process control area within the target region based on the first identifier code. In some embodiments, step 908 includes selecting specific features or attributes in the image that indicate that the test cartridge ran correctly. In some embodiments, step 908 may include verifying that a signal intensity at the end of a test channel in the test cartridge is higher than a selected threshold indicative that the sample flowed to the end. In some embodiments, step 908 includes verifying that a reference line appears at a selected location. In some embodiments, step 908 may include verifying that a signal intensity of a negative control is less than a selected threshold indicative of an assay interference. In some embodiments, step 908 may include verifying exposure, focus, and other optical characteristics of the image are satisfactory. Accordingly, in some embodiments, step 908 includes assessing whether the image is appropriate to send to the AI model for inferencing. For example, in some embodiments, step 908 includes verifying that a valid crop in the image contains features expected from a valid test cassette.

When a quality of the image meets a selected threshold, step 910 includes providing the image to the processor. In some embodiments, step 910 includes retrieving a calibration table from a remote server using the first identifier code, the calibration table associated with the image-capturing device, and indicative of a signal value that is a threshold for evaluating the quality of the image. In some embodiments, the calibration table may be stored in the client device, or may be provided to the client device from the server using a barcode in the test cartridge (which may be captured by the client device and provided to the server to retrieve the calibration table). In some embodiments, step 910 includes providing a second identifier code identifying the test cartridge to the processor, wherein evaluating the quality of the image further comprises selecting a threshold for a signal intensity in a process control area within the target region based on the second identifier code.

In some embodiments, a threshold may be modulated in order to classify a sample "Positive" or "Negative." In some embodiments, such modulation is performed by changing the normalization factor between training with multiple images and inferencing the resulting classification. In some embodiments, a "Positive" or "Negative" classification may be more robust and less prone to false positive or false negative results due to appropriate modulation of a selected threshold.

Figure 10:
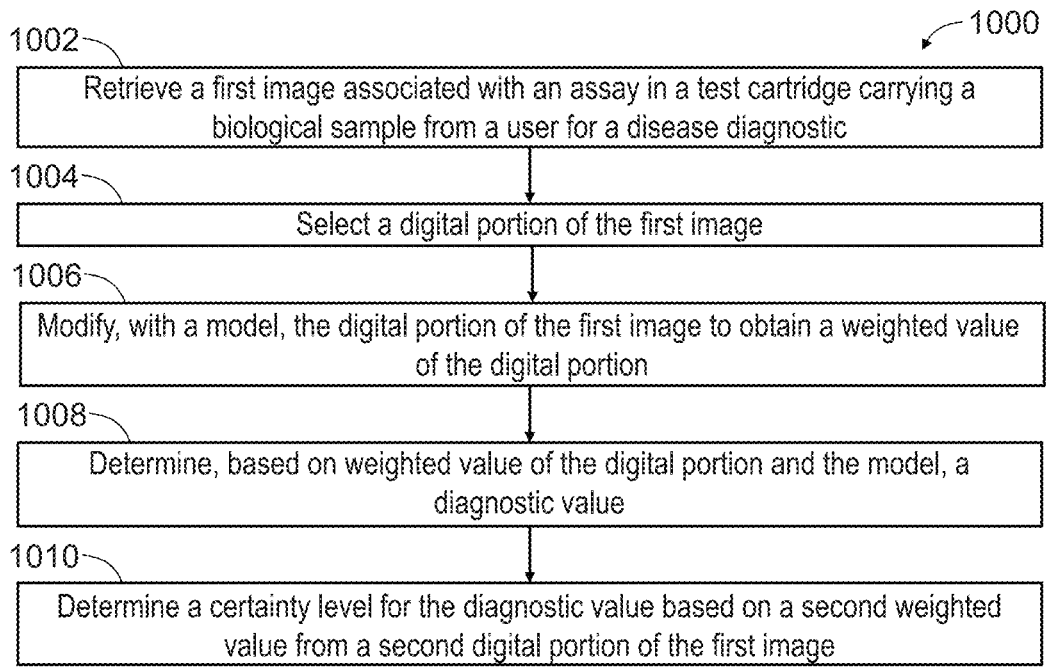
FIG. 10 is a flow chart illustrating steps in a method for determining the presence or absence of an analyte of interest, according to some embodiments.

FIG. 10 is a flow chart illustrating steps in a method 1000 for determining the presence or absence of an analyte of interest, according to some embodiments. Methods consistent with the present disclosure may include at least one or more of the steps in method 1000 performed at least partially by one or more devices in an architecture including a remote server, a database, a client device, and an image-capturing device as disclosed herein (e.g., architecture 10, remote server 130, database 152, client device 110, and image-capturing devices 100). Either one of the server, the database, the client device, and the image-capturing device may include a memory circuit storing instructions and a processor circuit configured to execute the instructions to perform, at least partially, one or more of the steps in method 1000 (e.g., memory circuit 132, and processor circuit 112). In some embodiments, at least one or all of the server, the database, the client device, or the image-capturing device may include a communications module configured to transmit and receive data to one or more of the devices in the architecture, through a network or via a one-to-one (wired or wireless) communication channel (e.g., communications modules 118 and network 150). In some embodiments, at least one of the steps in method 1000 may be partially performed by a diagnostic engine in a server, using an assay reading tool and an image processing tool as disclosed herein (e.g., diagnostic engine 240, assay reading tool 242, and image processing tool 244). In some embodiments, at least one of the steps in method 1000 may be partially performed by an application installed in a client device, the application including a diagnostic model hosted by the server (e.g., application 222 and diagnostic model 225). The image-capturing device may include an enclosure enshrouding a coupling mechanism and a cartridge mount configured to receive a test cartridge (e.g., enclosure 120, coupling mechanism 115, and test cartridge 101). The image of the illuminated test cartridge may include at least a portion of a reading zone in the test cartridge, delimited by a border line. The reading portion may include an immunoassay (e.g., a lateral flow immunoassay). In some embodiments, the lateral flow immunoassay may include a series of images of a lateral flow immunoassay collected over time.

In some embodiments, methods consistent with the present disclosure may include at least one step from method 1000, or more than one step from method 1000 performed in different order, or overlapping in time. For example, some embodiments consistent with the present disclosure may include one or more steps in method 1000 performed simultaneously, or quasi-simultaneously.

Step 1002 includes retrieving a first image associated with an assay in a test cartridge carrying a biological sample from a user for a disease diagnostic. In some embodiments, step 1002 includes receiving an image from a client device via a remote network communication channel. In some embodiments, step 1002 includes receiving the image from an image-capturing device via a wireless communication channel. In some embodiments, step 1002 includes accessing a database including multiple images of multiple assays including different biological samples from multiple users. In some embodiments, step 1002 includes retrieving a second image collected from a same assay at a different time and the digital portions are combined in with a time point in a non-linear fashion. In some embodiments, step 1002 include retrieving a second image collected from a same assay at a different time, and forming a volume between the first image and the second image, wherein selecting the digital portion of the first image comprises selecting a digital portion as a portion of the volume, the digital portion having a time dimension, and wherein the weighted value is associated to a dynamic value for the assay. In some embodiments, step 1002 includes receiving a first identification code identifying an image-capturing device that generated the first image, and adjusting the model based on a parameter associated with the image-capturing device. In some embodiments, step 1002 includes receiving a second identification code identifying the test cartridge, and adjusting the model based on a parameter associated with the test cartridge.

Step 1004 includes selecting a digital portion of the first image. In some embodiments, step 1004 includes cropping the digital portion to overlap a test channel in a prototype strip of the assay. In some embodiments, step 1004 includes matching the digital portion with a fiduciary mark at an edge of the first image associated with the assay in the test cartridge.

Step 1006 includes modifying, with a model, the digital portion of the first image to obtain a weighted value of the digital portion. In some embodiments, step 1006 includes aggregating multiple values of adjacent pixels within the digital portion into a convolution value, and modifying the convolution value by a factor selected from the model. In some embodiments, step 1006 includes convoluting a value of the digital portion of the first image with multiple values of adjacent digital portions of the first image according to a weighting coefficient in the model. In some embodiments, the model includes weighting factors obtained from training with multiple images in a database, each of the images associated with a known diagnostic outcome, and step 1006 includes comparing the known diagnostic outcome with the diagnostic value. In some embodiments, step 1006 includes retrieving a second image from a client device and evaluating a dynamic value for the assay based on a difference between the digital portion of the first image and a digital portion of the second image. In some embodiments, step 1006 includes updating the model with a modified weighted factor according to a comparison between the diagnostic value and a known diagnostic for a biological sample. In some embodiments, step 1006 includes selecting, with the model, a weighting factor to obtain the weighted value of the digital portion, based on a batch identifier of the test cartridge.

Step 1008 includes determining, based on the weighted value of the digital portion and the model, a diagnostic value.

Step 1010 includes determining a certainty level for the diagnostic value based on a second weighted value from a second digital portion of the first image.

In some embodiments, step 1010 may include updating the model when the certainty level for the diagnostic value is less than a predetermined value.

Hardware Overview

Figure 11:
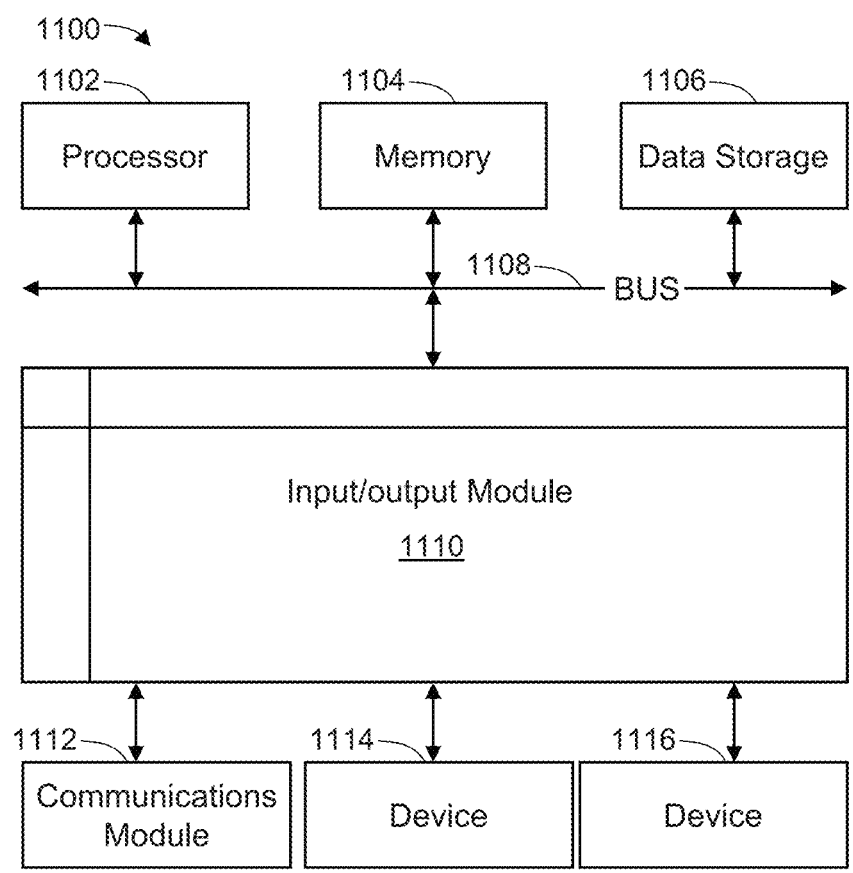
FIG. 11 is a block diagram illustrating an example computer system with which the client and server of FIGS. 1 and 2 and the methods of FIGS. 7-11 can be implemented.

FIG. 11 is a block diagram illustrating an exemplary computer system 1100 with which the client device 110 and server 130 of FIGS. 1 and 2, and the methods of FIGS. 8-10 can be implemented. In certain aspects, the computer system 1100 may be implemented using hardware or a combination of software and hardware, either in a dedicated server, or integrated into another entity, or distributed across multiple entities.

Computer system 1100 (e.g., client 110 and server 130) includes a bus 1108 or other communication mechanism for communicating information, and a processor 1102 (e.g., processors 112 and 212) coupled with bus 1108 for processing information. By way of example, the computer system 1100 may be implemented with one or more processors 1102. Processor 1102 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 1100 can include, in addition to hardware, code that creates an execution environment for the computer program in question, e.g., code that constitutes processor firmware, a protocol stack, a database management system, an operating system, or a combination of one or more of them stored in an included memory 1104 (e.g., memories 132 and 232), such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled to bus 1108 for storing information and instructions to be executed by processor 1102. The processor 1102 and the memory 1104 can be supplemented by, or incorporated in, special purpose logic circuitry.

The instructions may be stored in the memory 1104 and implemented in one or more computer program products, e.g., one or more modules of computer program instructions encoded on a computer-readable medium for execution by, or to control the operation of, the computer system 1100, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 1104 may also be used for storing temporary variable or other intermediate information during execution of instructions to be executed by processor 1102.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 1100 further includes a data storage device 1106 such as a magnetic disk or optical disk, coupled to bus 1108 for storing information and instructions. Computer system 1100 may be coupled via input/output module 1110 to various devices. Input/output module 1110 can be any input/output module. Exemplary input/output modules 1110 include data ports such as USB ports. The input/output module 1110 is configured to connect to a communications module 1112. Exemplary communications modules 1112 (e.g., communications modules 118 and 218) include networking interface cards, such as Ethernet cards and modems. In certain aspects, input/output module 1110 is configured to connect to a plurality of devices, such as an input device 1114 (e.g., input device 214) and/or an output device 1116 (e.g., output device 216). Exemplary input devices 1114 include a keyboard and a pointing device, e.g., a mouse or a trackball, by which a user can provide input to the computer system 1100. Other kinds of input devices 1114 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Exemplary output devices 1116 include display devices, such as an LCD (liquid crystal display) monitor, for displaying information to the user.

According to one aspect of the present disclosure, the client device 110 and server 130 can be implemented using a computer system 1100 in response to processor 1102 executing one or more sequences of one or more instructions contained in memory 1104. Such instructions may be read into memory 1104 from another machine-readable medium, such as data storage device 1106. Execution of the sequences of instructions contained in main memory 1104 causes processor 1102 to perform the process steps described herein. One or more processors in a multi-processing arrangement may also be employed to execute the sequences of instructions contained in memory 1104. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication tool (e.g., network 150) can include, for example, any one or more of a LAN, a WAN, the Internet, and the like. Further, the communication tool can include, but is not limited to, for example, any one or more of the following tool topologies, including a bus network, a star network, a ring network, a mesh network, a star-bus network, tree or hierarchical network, or the like. The communications modules can be, for example, modems or Ethernet cards.

Computer system 1100 can include clients and servers. A client and server are generally remote from each other and typically interact through a communication network. The relationship of client and server arises by virtue of computer programs running on the respective computers and having a client-server relationship to each other. Computer system 1100 can be, for example, and without limitation, a desktop computer, laptop computer, or tablet computer. Computer system 1100 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to processor 1102 for execution. Such a medium may take many forms, including, but not limited to, non-volatile media, volatile media, and transmission media. Non-volatile media include, for example, optical or magnetic disks, such as data storage device 1106. Volatile media include dynamic memory, such as memory 1104. Transmission media include coaxial cables, copper wire, and fiber optics, including the wires forming bus 1108. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter affecting a machine-readable propagated signal, or a combination of one or more of them.

To illustrate the interchangeability of hardware and software, items such as the various illustrative blocks, modules, components, methods, operations, instructions, and algorithms have been described generally in terms of their functionality. Whether such functionality is implemented as hardware, software, or a combination of hardware and software depends upon the particular application and design constraints imposed on the overall system. Skilled artisans may implement the described functionality in varying ways for each particular application.

The immunoassay test strip mentioned above, such as that in test cartridge 101, may be configured uniquely for detection of a particular pathogen or analyte of species of interest. These include, but are not limited to, proteins, haptens, immunoglobulins, enzymes, hormones, polynucleotides, steroids, lipoproteins, drugs (including drugs of abuse), bacterial antigens, and viral antigens. With regard to bacterial and viral antigens, more generally referred to in the art as infectious antigens, analytes of interest include *Streptococcus*, Influenza A, Influenza B, respiratory syncytial virus (RSV), hepatitis A, B, and/or C, pneumococcal, human metapneumovirus, and other infectious agents well-known to those in the art. In some embodiments, a test device is intended for detection of one or more of antigens associated with Lyme disease. In some embodiments, an immunoassay test strip is intended for use in the field of women's health. For example, test devices for detection of one or more of fetal-fibronectin, chlamydia, human chorionic gonadotropin (hCG), hyperglycosylated chorionic gonadotropin, human papillomavirus (HPV), and the like, are contemplated. In another embodiment, an immunoassay test strip for detection of vitamin D is designed for interaction with the apparatus and method of normalization described herein.

An exemplary immunoassay test strip may include a sample receiving zone in fluid communication with a label zone. A fluid sample placed on or in the sample zone flows by capillary action from the sample zone in a downstream direction. A label zone is in fluid communication with at least a test line or band and, optionally, a control line or band and/or a reference line or band. Typically, the label zone is downstream from the sample zone, and the series of control and test lines are downstream from the label zone, and an optional absorbent pad is downstream from the portion of the test strip on which the lines are positioned.

The sample zone receives the sample suspected of containing an analyte of interest. The label zone, in some embodiments, contains two dried conjugates that are comprised of particles containing a label element. The label element includes a label that emits a signal in any of a number of selected emission processes: e.g., electromagnetic radiation, alpha particle radiation, positron radiation, beta radiation, and the like. In some embodiments, the electromagnetic radiation emission may include a fluorescence emission, Raman emission, and the like. Further, in some embodiments, the label may absorb a selected type of radiation, e.g., electromagnetic radiation as in microwave absorption, infrared (IR) absorption, visible absorption, or ultraviolet (UV) absorption. Further, in some embodiments, the label element may include multiple label elements selected from all or more of the above radiation emission and/or absorption described above.

Without loss of generality, and to illustrate the operation of the system at hand, in one embodiment the label element may include a fluorescent element. An exemplary fluorescent element is a lanthanide material, such as one of the fifteen elements lanthanum, cerium, praseodymium, neodymium, promethium, samarium, europium, gadolinium, terbium, dysprosium, holmium, erbium, ytterbium, lutetium, and yttrium. In one embodiment, the lanthanide material is embedded in or on a particle, such as a polystyrene particle. The particles can be microparticles (particles less than about 1,000 micrometers in diameter, in some instances less than about 500 micrometers in diameter, in some instances less than 200, 150, or 100 micrometers in diameter) containing a luminescent or fluorescent lanthanide, wherein in some embodiments, the lanthanide is europium. In some embodiments, the lanthanide is a chelated europium. The microparticles, in some embodiments, have a core of a lanthanide material with a polymeric coating, such as an europium core with polystyrene coating. A binding partner for the analyte (s) of interest in the sample is/are attached to or associated with the outer surface of the microparticles. In some embodiments, the binding partner for the analyte(s) of interest is an antibody, a monoclonal antibody, or a polyclonal antibody. A skilled artisan will appreciate that other binding partners can be selected, and can include complexes such as a biotin and streptavidin complex. When a liquid sample enters a label zone of an exemplary immunoassay test strip, the liquid sample hydrates, suspends, and mobilizes the dried microparticle-antibody conjugates and carries the conjugates together with the sample downstream on the test strip to the control or reference and/or test lines disposed on the immunoassay test strip. If an analyte of interest is present in the sample, it will bind to its respective conjugate as the specimen and microparticles flow from the label zone.

As the sample and microparticle-antibody conjugates continue to flow downstream on the immunoassay test strip, if the analyte of interest is present in the sample, the fluorescent microparticle-antibody conjugate, which is now bound with antigen/analyte of interest, will bind to the specific binding member for the analyte of interest that is immobilized at the test line(s). In some embodiments, a single test line is present on the test strip. In some embodiments, at least two, or two or more test lines are present on the strip. By way of example, a test strip intended for detection and/or discrimination of influenza A and influenza B can include a first test line to detect influenza A and a second test line to detect influenza B. Microparticle-antibody conjugates comprised of microparticles coated with antibodies specific for influenza A and microparticles coated with antibodies specific for influenza B may be included in the label zone, and in some embodiments, downstream of the negative control line. A first test line for influenza A and a second test line for influenza B can be disposed downstream of the label zone. The first test line for influenza A comprises a monoclonal or polyclonal antibody to a determinant on the nucleoprotein of influenza A and the second test line for influenza B comprises a monoclonal or polyclonal antibody to a determinant on the nucleoprotein of influenza B. If an antigen is present in the sample, a typical immunoassay sandwich will form on the respective test line that matches the antigen in the sample. Other assays may include SARS COV2 assays, with substantially the same architecture as the assay mentioned above, for influenza A and/or B. Other assays may include serology assays where the presence of Antibodies against a pathogen can be determined.

In addition to the one analyte, one path, some embodiments may include assays that allow the analysis of multiple analytes in the same path. In yet other embodiments, an assay may include multiple analytes in multiple paths for one flow direction, like the RVP4 assay. In some embodiments, and assay may include multiple analytes in multiple flow directions, like the Lyme assay (SOFIA Lyme, Quidel Corporation), or modified Lyme assay.

The microparticle-antibody conjugates that do not bind to the negative control line or to a test line continue to flow by capillary action downstream, and the remaining sample encounters the reference line, in some embodiments proceeding into the absorbent pad.

The immunoassay test device is intended for receiving a wide variety of samples, including biological samples from human bodily fluids, including but not limited to, nasal secretions, nasopharyngeal secretions, saliva, mucous, urine, vaginal secretions, fecal samples, blood, etc.

Immunoassay test kits, in some embodiments, are provided with a positive control swab or sample. In some embodiments, a negative control swab or sample is provided. For assays requiring an external positive and/or negative control, the user may be prompted to insert or apply a positive or negative control sample or swab.

An immunoassay band emits fluorescence light primarily from fluorophores bound to the target analyte, as they are fixed on the substrate by adherence to the immuno-proteins in the immunoassay strip (e.g., adsorption, chemi-sorption, immune-ligand, and the like). Accordingly, the presence of a red emission within the boundaries of the band is mostly attributable to the presence of the target analyte (e.g., presence of pathogenic antigens, and the like). However, the amount of red signal within the boundaries of the immunoassay band may include some background. To better assess the background signal (e.g., not originated by target analytes bound to the antibodies on the band), some sample cartridges may include a blank control area.

As used herein, the phrase "at least one of" preceding a series of items, with the terms "and" or "or" to separate any of the items, modifies the list as a whole, rather than each member of the list (e.g., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include," "have," or the like is used in the description or the clauses, such term is intended to be inclusive in a manner similar to the term "include" as "include" is interpreted when employed as a transitional word in a clause. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following clauses. For example, while operations are depicted in the drawings in a particular order, this should not be understood as requiring that such operations be performed in the particular order shown or in sequential order, or that all illustrated operations be performed, to achieve desirable results. The actions recited in the clauses can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following clauses.

In one aspect, a method may be an operation, an instruction, or a function and vice versa. In one aspect, a clause may be amended to include some or all of the words (e.g., instructions, operations, functions, or components) recited in other one or more clauses, one or more words, one or more sentences, one or more phrases, one or more paragraphs, and/or one or more clauses.

To illustrate the interchangeability of hardware and software, items such as the various illustrative blocks, modules, components, methods, operations, instructions, and algorithms have been described generally in terms of their functionality. Whether such functionality is implemented as hardware, software, or a combination of hardware and software depends upon the particular application and design constraints imposed on the overall system. Skilled artisans may implement the described functionality in varying ways for each particular application.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

Pronouns in the masculine (e.g., his) include the feminine and neuter gender (e.g., her and its) and vice versa. The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. No clause element is to be construed under the provisions of 35 U.S.C. § 112, sixth paragraph, unless the element is expressly recited using the phrase "means for" or, in the case of a method clause, the element is recited using the phrase "step for."

What is claimed is:

1. A computer-implemented method, comprising:
   receiving one or more images from an image-capturing device, the one or more images comprising an area of interest in a test cartridge;
   finding a border of the area of interest of the test cartridge and applying a geometrical transformation on an area delimited by the border of the test cartridge to bring an image of the area of interest in the test cartridge to a selected size and a selected shape;
   identifying a target region within the area of interest of the test cartridge;
   evaluating a quality of the one or more images based on a characteristic feature of the target region;
   providing commands to adjust an optical coupling and a frequency rate for collecting the one or more images in the image-capturing device when the quality of the one or more images is lower than a selected threshold; and
   when the quality of the one or more images meets the selected threshold, providing the one or more images to a processor that contains software designed to assess a subject diagnostics based on a digital analysis of the one or more images.

2. The computer-implemented method of claim 1, wherein evaluating the quality of the one or more images further comprises evaluating a second image, wherein the second image is one of a background sample or a blank sample.

3. The computer-implemented method of claim 1, further comprising normalizing an intensity value for a pixel in an image of the area of interest relative to a selected intensity value from multiple pixels in the image of the area of interest.

4. The computer-implemented method of claim 1, wherein the target region comprises a process control area including at least one of a positive control area or a negative control area, and evaluating a quality of the one or more images comprises evaluating a signal intensity in the process control area.

5. The computer-implemented method of claim 1, wherein identifying a target region within the area of interest comprises identifying at least a test line and a control line in the area of interest of the test cartridge within a field of view of the one or more images.

6. The computer-implemented method of claim 1, further comprising displaying the one or more images in a computer display, and including a viewing guide in the computer display, the viewing guide overlapping at least a portion of the digital analysis of the one or more images.

7. The computer-implemented method of claim 1, further comprising displaying a test result in a computer display, and not displaying the one or more images.

8. The computer-implemented method of claim 1, wherein evaluating a quality of the one or more images comprises comparing a selected feature of the one or more images with a value associated with selected features of multiple images having known quality values.

9. A computer-implemented method, comprising:
   receiving a first image from an image-capturing device, the first image comprising an area of interest in a test cartridge, at a first time;
   receiving a second image from the image-capturing device, the second image comprising a same area of interest in the test cartridge, at a second time;
   forming a volume of interest, having a time dimension between the first image and the second image;
   associating a dynamic value for an assay in the test cartridge based on the time dimension;
   providing a first identifier code identifying the image-capturing device to a processor that contains software designed to assess a subject diagnostics based on a digital analysis of the first image;
   identifying a target region within the area of interest of the test cartridge;
   evaluating a quality of the first image based on a characteristic feature of the target region, the dynamic value for the assay, and on the first identifier code; and
   when a quality of the first image meets a selected threshold, providing the first image to the processor.

10. The computer-implemented method of claim 9, further comprising retrieving a calibration table from a remote server using the first identifier code, the calibration table associated with the image-capturing device, and indicative of a signal value that is a threshold for evaluating the quality of the first image.

11. The computer-implemented method of claim 9, wherein evaluating a quality of the first image comprises selecting a threshold for a signal intensity in a process control area within the target region based on the first identifier code.

12. The computer-implemented method of claim 9, wherein evaluating a quality of the first image comprises verifying that a signal intensity at an end of a test channel in the test cartridge is higher than a selected threshold indicative that a sample flowed to the end.

13. The computer-implemented method of claim 9, wherein evaluating a quality of the first image comprises verifying that a reference line appears at a selected location.

14. The computer-implemented method of claim 9, wherein evaluating a quality of the first image comprises verifying that a signal intensity of a negative control is less than a selected threshold indicative of an assay interference.

15. The computer-implemented method of claim 9, wherein evaluating a quality of the first image comprises verifying an exposure and a focus.

16. The computer-implemented method of claim 9, wherein evaluating a quality of the first image comprises assessing whether the first image is appropriate to send to an artificial intelligence model for inferencing.

17. The computer-implemented method of claim 9, wherein evaluating a quality of the first image comprises verifying that a valid crop in the first image contains features from a test cassette.

18. The computer-implemented method of claim 9, wherein evaluating a quality of the first image comprises monitoring a physical attribute of the image-capturing device.

19. The computer: implemented method of claim 18, wherein the physical attribute is internal temperature of the image-capturing device.

20. A computer-implemented method, comprising:
retrieving a first image associated with an assay in a test cartridge carrying a biological sample from a user for a disease diagnostic;
receiving a second image comprising a same area of interest in the test cartridge, at a second time;
forming a volume of interest, having a time dimension between the first image and the second image;
selecting a digital portion including the volume of interest;
modifying, with a model, the digital portion of the first image to obtain a weighted value of the digital portion associating a dynamic value for an assay in the test cartridge based on the time dimension;
determining, based on the weighted value of the digital portion and the model, a diagnostic value; and
determining a certainty level for the diagnostic value based on a second weighted value from a second digital portion of the second image and the dynamic value for the assay in the test cartridge.

21. The computer-implemented method of claim 20, wherein retrieving the first image comprises receiving an image from a client device via a remote network communication channel.

22. The computer-implemented method of claim 20, wherein retrieving the first image comprises accessing a database including multiple images of multiple assays including different biological samples from multiple users.

23. The computer-implemented method of claim 20, further comprising updating the model when the certainty level for the diagnostic value is less than a predetermined value.

24. The computer-implemented method of claim 20, wherein modifying the digital portion of the first image comprises convoluting a value of the digital portion of the first image with multiple values of adjacent digital portions of the first image according to a weighting coefficient in the model.

25. The computer-implemented method of claim 20, wherein the assay is an immunoassay.

26. The computer-implemented method of claim 20, wherein the assay is a lateral flow immunoassay.

27. The computer-implemented method of claim 20, wherein the assay is a molecular diagnostic assay.

28. The computer-implemented method of claim 27, wherein the molecular diagnostic assay comprises amplification of a molecular target and binding of the molecular target to a surface for visualization.

* * * * *